Nov. 12, 1963  J. R. SPEAR  3,110,077
JIGS FOR MAKING POMPONS
Filed May 1, 1961

INVENTOR
J. R. Spear

BY
ATTORNEYS

United States Patent Office 3,110,077
Patented Nov. 12, 1963

3,110,077
JIGS FOR MAKING POMPONS
Jakob Richard Spear, Enfield, England, assignor to J. W. Spear & Sons Limited, Enfield, England, a British company
Filed May 1, 1961, Ser. No. 106,661
Claims priority, application Great Britain Mar. 15, 1961
5 Claims. (Cl. 28—2)

This invention relates to devices for manufacturing balls composed of stranded material such as wool and known as pompons.

Pompons are usually formed on a crcular jig consisting of two annuli disposed adjacent each other and preferably spaced apart to allow for one of the manufacturing operations.

It is the object of this invention to provide an improved jig for manufacturing pompons which is simple to operate and inexpensive to produce.

According to the present invention a jig for manufacturing pompons comprises two adjacent annular, elliptical or substantially elliptical members spaced apart, each member being made up of two segments, in which each segment is provided with outwardly extending flanges, the flanges being formed with means which co-operate to fasten one segment to another.

In a particular embodiment the means provided for fastening one segment to another comprise projections on the flanges of one segment which are received by co-operating portions of the flanges of a segment to which it is to be fastened.

Two pompon jigs embodying the invention will now be described in greater detail, as examples, with reference to the accompanying drawings in which.

Figure 1:
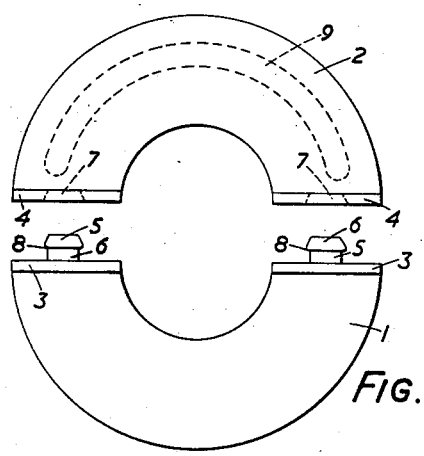
FIGURE 1 is an exploded front elevational view of one half of the first embodiment.
Figure 3:
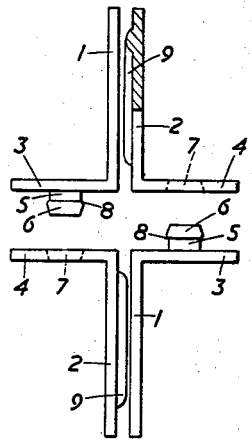
FIGURE 3 is an exploded side elevational view of the complete embodiment.
Figure 2:
FIGURE 2 is a plan view of the bottom half of FIGURE 1.

Referring to FIGS. 1, 2 and 3, the jig comprises two annuli moulded from semi-rigid synthetic plastic, each annulus being made up of two semi-circular segments 1 and 2. Each of the segments 1 and 2 is provided at its two ends with a flange 3 and 4 respectively which extend outwardly normal to the plane of the segments. The flanges 3 of segments 1 are provided with extensions consisting of a collar portion 5 and tapered head portion 6 while the flanges 4 of the segments 2 are formed with tapered holes 7 which receive the collars and heads of the flanges 3, the portion 8 of the heads 6 engaging the circumference of the parts of hole 7 with the smallest diameter. The extensions are arranged to "snap" into the holes 7, thus giving easy assembly and detachment.

The segments 2 are formed with an upstanding arcuate rib 9 which extends parallel to the periphery of the segment and disposed on the side opposite to that from which the flanges 4 extend. On assembly of the jig the ribs 9 provide spacing means substantially all round the annuli.

A pompon is manufactured by first taking one each of segments 1 and 2 and positioning one with respect to the other in such manner that the flanges 3 and 4 extend outwardly and are co-planar, and the rib 9 of segment 2 spaces this segment from segment 1, thus forming a unit upon which yarn may be wound. Holding the two segments in this position wool or other material is wound progressively around and radially of the unit, the turns being regular to ensure a uniform pompon. Layer upon layer of wool is wound until sufficient layers have been accumulated according to the size of pompon required. For a large pompon it is preferable to wind numerous strands of material together.

When sufficient layers have been wound the second of segments 1 and 2 are taken and positioned one with respect to the other as before and a corresponding number of layers of wool wound on to this unit as for the first unit. This completed, the two units are fastened together to form a substantially complete annulus of wound wool by snapping the heads 6 on flanges 3 into corresponding holes of flanges 4. The wool is now cut along the circumference of the annulus by placing a scissors blade through the wool and between the two annuli making up the jig, the gap formed by the spacing ribs 9 making this possible. Thin, but strong, string or cord is then placed between the two annuli and tied quickly in order to secure the cut strands of wool, the strands forming a pompon and being detachable from the jig. Any necessary trimming is then executed and the pompon is finished whereupon the jig may be dismantled and re-used or stored.

It will be appreciated that an advantage of this jig lies in the fact that it is not until all the layers of wool have been wound that the jig is completely assembled and this enables the wool to be wound easily and quickly on the unit formed as hereinbefore described, thus avoiding the time wasting task of threading each turn of wool through the centre of a complete jig.

Figure 4:
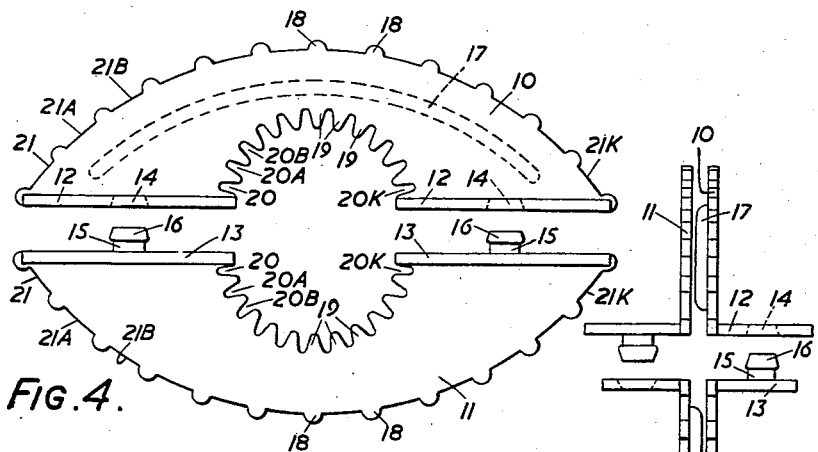
FIGS. 4, 5 and 6 are views of the second embodiment corresponding to FIGS. 1, 2 and 3 respectively.
Figure 5:
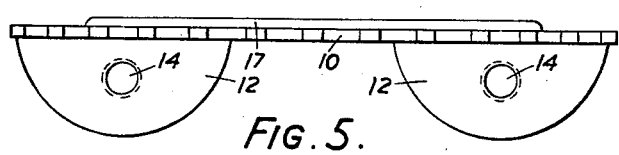
Figure 6:
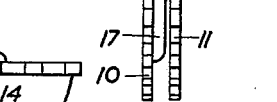

A second jig embodying the invention is shown in FIGS. 4–6 which enjoys the above advantage and enables an ovoidal pompon to be made.

This jig comprises two pairs of semi-elliptical segments 10 and 11 moulded from semi-rigid synthetic plastic each segment being formed with flanges 12 and 13 respectively which extend normally to the plane of the segment. Tapered holes 14 are provided in flanges 12 and extension consisting of a collar 15 and tapered head 16 are provided on flanges 13. The holes 14, collars 15 and heads 16 co-operate in a manner similar to that described for the corresponding members of the previous embodiment. Also as in the previous embodiment, spacing ribs are provided in the form of an upstanding rib 17 formed on segment 10 and extending parallel to the periphery thereof.

The periphery of segments 10 and 11 is formed with spaced, radially extending, projections 18. The inner edges of the segments 10 and 11 are semi-circular and are formed with teeth 19 which give rise to spaces 20, 20A, 20B . . . 20K. The number of such spaces equals the number of surfaces 21, 21A, 21B . . . 21K which are separated by the projections 18 on the periphery of the segments.

To make an ovoidal pompon one each of segments 10 and 11 are taken and positioned one with respect to another in a similar fashion to segments 1 and 2 in the previous embodiment. Holding the two segments thus the wool is first wound progressively around and radially round space 20 and surface 21 until regular turns have been wound all along surface 21. The wool is then transferred to space 20A and surface 21A and wound until surface 21A has been filled. The wool is then transferred to space 20B and surface 21B and so on until the last space and surface 20K and 21K respectively. If a large pompon is required then further layers of wool may be wound the next layer being started in space 20K and surface 21K, working back to space 20 and surface 21.

The projections 18 and teeth 19 prevent the wool from slipping when wound and so enable a regular pompon to be produced.

When sufficient layers of wool have been wound on the first of segments 10 and 11, the second of these segments are taken and the process repeated. The two halves of the pompon are then assembled, the pompon cut, secured and trimmed in the manner as described for the previous embodiment.

Although in the example described the jig components are of synthetic plastic, other appropriate materials may be used. The jigs may for example be made from metal such as steel or non-ferrous metals and press fasteners may be used instead of the "snap-in" devices described.

Again in making the pompons materials other than wool may be used. Thus other stranded materials such as raffia straw, string or cord, for example, are quite suitable.

I claim:

1. A device for making pompons comprising a first annulus and a second annulus, each composed of two semicircular segments, a flange at each end of each segment extending angularly away from the median plane thereof, each segment of each annulus being shaped and dimensioned to be positioned in registration with one of the segments of the other annulus with the flanges of the registering segments projecting in opposite directions, in which position said registering segments form a unit upon which elongate material may be wound, integral spacer means on one segment of each annulus projecting therefrom in a direction opposite to that in which the flange thereon projects so as to space it from a registering annulus, fastening means formed on the flanges of one of the segments of each annulus and mating fastening means formed on the flanges of the other segment of the same annulus for releasably securing the segments of each annulus together after the formation of said units.

2. A device for making pompons according to claim 1 wherein said integral spacer means is constituted by an upstanding rib extending from end to end, and parallel to the edges, of the segment on which it is formed.

3. A device for making pompons comprising a first elliptical annulus and a second elliptical annulus, each composed of two semi-elliptical segments, a flange at each end of each segment extending angularly away from the median plane thereof, each segment of each annulus being shaped and dimensioned to be positioned in registration with one of the segments of the other annulus with the flanges of the registering segments projecting in opposite directions, in which position said registering segments form a unit upon which elongate material may be wound, integral spacer means on one segment of each annulus projecting therefrom in a direction opposite to that in which the flange thereon projects so as to space it from a registering annulus, fastening means formed on the flanges of one of the segments of each annulus and mating fastening means formed on the flanges of the other segment of the same annulus for releasably securing the segments of each annulus together after the formation of said units.

4. A device for making pompons according to claim 3 wherein each of said segments are formed with projections extending radially of, and equi-spaced along, opposed edges of the segments.

5. A device for making pompons according to claim 3 wherein said integral spacer element is constituted by an upstanding rib extending from end to end, and parallel to the edges, of the segment on which it is formed.

References Cited in the file of this patent

FOREIGN PATENTS 143,157     Australia _____ Oct. 25, 1935